United States Patent
Ito

(10) Patent No.: US 11,765,284 B2
(45) Date of Patent: Sep. 19, 2023

(54) IMAGE PROCESSING APPARATUS, METHOD OF CONTROLLING THE IMAGE PROCESSING APPARATUS AND NON-TRANSITORY STORAGE MEDIUM FOR TRANSMITTING SCANNED DOCUMENT TO CLOUD SERVER AND REQUEST TO GENERATE STORAGE DESTINATION INFORMATION INDICATING AN EXPIRATION DATE

(71) Applicant: CANON KABUSHIKI KAISHA, Tokyo (JP)

(72) Inventor: Chie Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/344,686

(22) Filed: Jun. 10, 2021

(65) Prior Publication Data

US 2021/0409554 A1 Dec. 30, 2021

(30) Foreign Application Priority Data

Jun. 30, 2020 (JP) .................... 2020-113361

(51) Int. Cl.
*H04N 1/44* (2006.01)
*H04N 1/00* (2006.01)
*G06F 3/12* (2006.01)
*G06V 10/10* (2022.01)

(52) U.S. Cl.
CPC ..... *H04N 1/00209* (2013.01); *H04N 1/00244* (2013.01); *H04N 1/4433* (2013.01); *G06F 3/1222* (2013.01); *G06V 10/10* (2022.01); *H04N 2201/0094* (2013.01)

(58) Field of Classification Search
None
See application file for complete search history.

(56) References Cited

U.S. PATENT DOCUMENTS

| 8,947,706 | B2 * | 2/2015 | Ichida | G06F 3/1222 |
| | | | | 358/1.9 |
| 10,827,082 | B1 * | 11/2020 | Diasti | H04N 1/32587 |
| 2016/0364192 | A1 * | 12/2016 | Fujii | H04N 1/00244 |
| 2017/0353621 | A1 * | 12/2017 | Saito | H04N 1/00408 |
| 2018/0101334 | A1 * | 4/2018 | Suzuki | H04N 1/0023 |
| 2021/0274053 | A1 * | 9/2021 | Yano | H04N 1/00244 |

FOREIGN PATENT DOCUMENTS

JP 2017-188880 A 10/2017

* cited by examiner

*Primary Examiner* — Haris Sabah
(74) *Attorney, Agent, or Firm* — Canon U.S.A., Inc. IP Division

(57) ABSTRACT

An image processing apparatus to communicate with a cloud service via a network includes a reading unit configured to read an image on a document, a transmission unit configured to transmit the read image to the cloud service, a request unit configured to request the cloud service to generate information for downloading the transmitted image, a reception unit configured to, based on the request, receive the information transmitted from the cloud server, and a notification unit configured to notify a user of the received information.

20 Claims, 10 Drawing Sheets

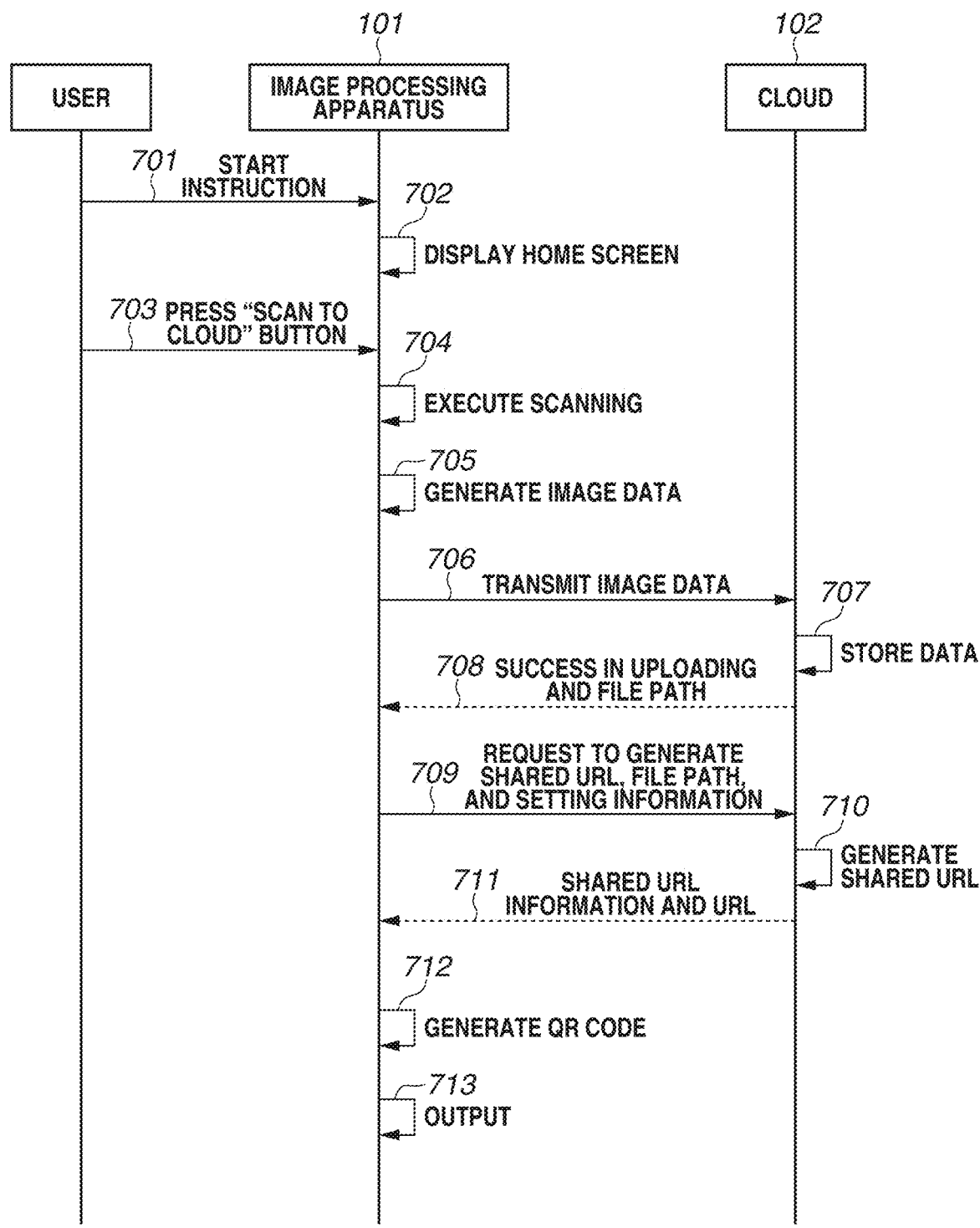

FIG.8

```
import dropbox
ACCESS_TOKEN = 'ACCESS_TOKEN'  ~801

: :
Dbx = dropbox.Dropbox(ACCESS_TOKEN)

path = '/images/scan001.jpg'  ~802

: :
f = open(scan_file, 'rb')  ~803
dbx.files_upload(f.read(),path )
f.close()

: :
setting =
dropbox.sharing.SharedLinkSettings(requested_visibility=dropbox.sharing.RequestedVisibility.public)  ~804
link = dbx.sharing_create_shared_link_with_settings(path=path,settings=setting)

: :
links = dbx.sharing_list_shared_links(path=path, direct_only=True).links  ~805
```

IMAGE PROCESSING APPARATUS, METHOD OF CONTROLLING THE IMAGE PROCESSING APPARATUS AND NON-TRANSITORY STORAGE MEDIUM FOR TRANSMITTING SCANNED DOCUMENT TO CLOUD SERVER AND REQUEST TO GENERATE STORAGE DESTINATION INFORMATION INDICATING AN EXPIRATION DATE

BACKGROUND

Field of the Disclosure

The present disclosure relates to an image processing apparatus, a method of controlling the image processing apparatus, and a storage medium.

Description of the Related Art

In recent years, shared offices and coworking spaces have drawn attention, and examples of equipment used in shared offices and coworking spaces include image processing apparatuses such as multifunction peripherals. Further, many companies are introducing cloud services.

There is a demand in users of cloud services fir uploading image data generated by reading a document using an image processing apparatus in a shared office or a coworking space to a cloud service or a business chat used in a company a user works for.

However, taking security into account, the easy connection of such an image processing apparatus as used by many and unspecified users to a cloud service used in a company the user works for is undesirable. Even if an attempt is made to connect an image processing apparatus to a cloud service, there are no simple procedures for connecting them. Under the current circumstances, it is difficult to easily obtain the image data generated by reading documents using image processing apparatuses in shared offices or coworking spaces.

Japanese Patent Application Laid-Open No. 2017-188880 discusses an image reading apparatus to communicate with a cloud server via a network.

Image processing apparatuses in shared offices or coworking spaces are used by many and unspecified users and, as a result, they are often able to use image processing apparatuses in them without logging into the image processing apparatuses. Thus, to use a cloud service, it is troublesome for the user to register an account for the cloud service in such an image processing apparatus.

In the method of the publication of Japanese Patent Application Laid-Open No. 2017-188880, a user logs into a cloud service in advance using a terminal such as a personal computer (PC) or a smartphone, generates a ticket including data storage folder information and login information, and transmits the ticket to an image processing apparatus. When the user logs into the image processing apparatus and operates it to perform scanning, the image processing apparatus reads the ticket associated with the logged-in user and uploads the data to the cloud. That is, the method discussed in Japanese Patent Application Laid-Open No. 2017-188880 is based on the premise that the account for the cloud service has been registered in advance in the image processing apparatus.

Meanwhile, many cloud services and business chats have a temporary shared file function for allowing even a user without an account for a cloud service or a business chat to share a file on them. For example, in Dropbox® provided by Dropbox, Inc., the link sharing function creates a link to a file or folder in Dropbox. The link is a unique Uniform Resource Locator (URL), and allows the content of the file to be displayed on a browser or the file to be downloaded via the URL.

SUMMARY

According to embodiments of the present disclosure, an image processing apparatus to communicate with a cloud service via a network includes a reading unit configured to read an image on a document, a transmission unit configured to transmit the read image to the cloud service, a request unit configured to request the cloud service to generate information for downloading the transmitted image, a reception unit configured to, based on the request, receive the information transmitted from the cloud server, and a notification unit configured to notify a user of the received information.

Further features of the present disclosure will become apparent from the following description of exemplary embodiments with reference to the attached drawings.

BRIEF DESCRIPTION OF THE DRAWINGS

FIG. 7 illustrates an example of a sequence between the image processing apparatus and the cloud.

FIG. 8 illustrates an example of a program run by the image processing apparatus.

DESCRIPTION OF THE EMBODIMENTS

Some exemplary embodiments of the present disclosure will be described in detail below with reference to the attached drawings. In the present exemplary embodiments, a multifunction peripheral having a print function and a scan function will be used as an example of an image processing apparatus. This example, however, does not limit the present disclosure. In addition, not every combination of the features described in the present exemplary embodiments is used to solve the issues in the present disclosure.

Figure 1:
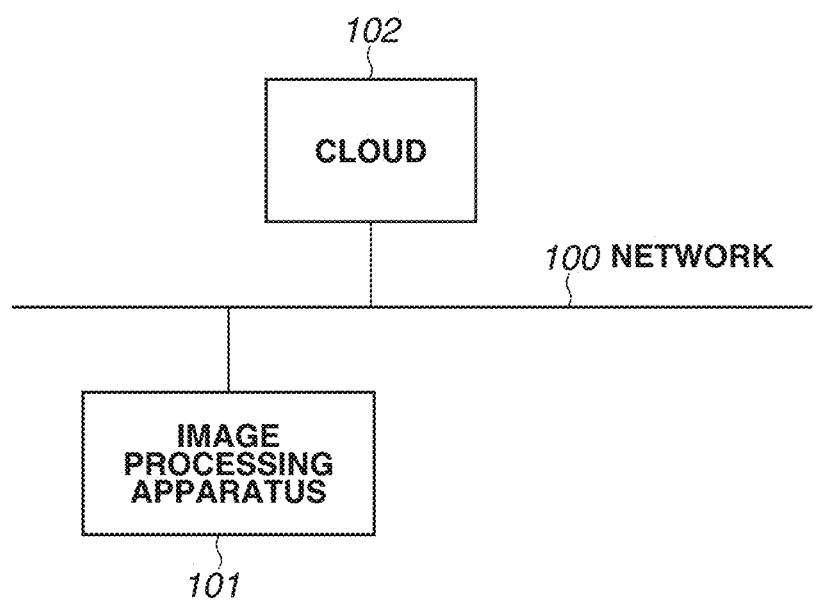
FIG. 1 is an overall configuration diagram of a system according to an exemplary embodiment of the present disclosure.

FIG. 1 is a system configuration diagram illustrating an image processing system according to a first exemplary embodiment. An image processing apparatus 101 and a cloud 102 are connected to each other via a network 100 so that the image processing apparatus 101 anal the cloud 102 can communicate with each other. A plurality of image processing apparatuses and servers (not illustrated) may be connected to the image processing apparatus 101 and the cloud 102.

The image processing apparatus 101 has the functionality of transmitting files including image data obtained by scanning document images to the cloud 102 via the network 100. The cloud 102 provides an online storage service functionality of storing files transmitted from the image processing apparatus 101, and various services. The cloud 102 may include a single cloud server or a plurality of cloud server groups. The image processing apparatus 101 and the cloud 102 may be included in a network.

Figure 2:
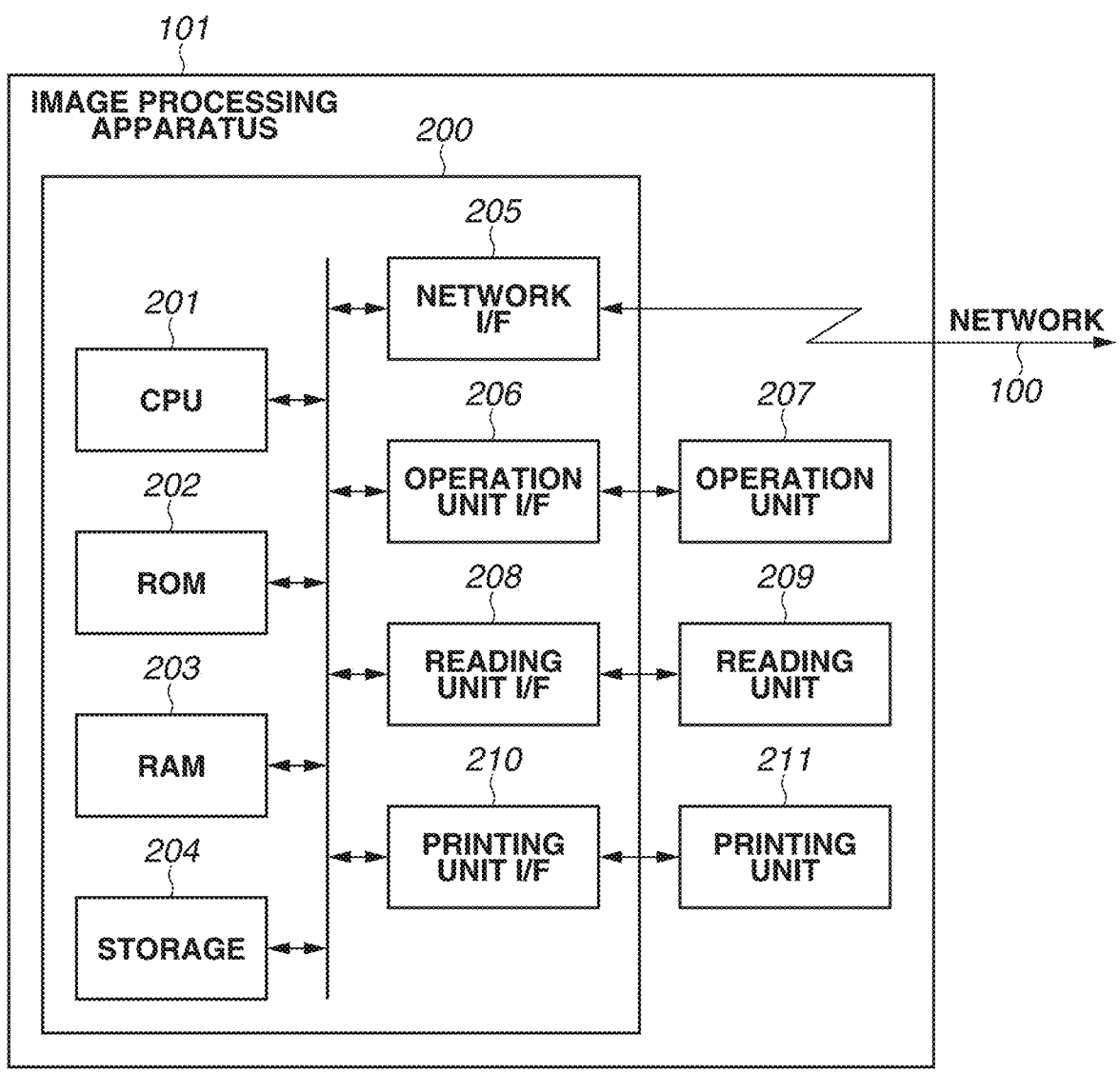
FIG. 2 is a hardware configuration diagram of an image processing apparatus.

FIG. 2 is a block diagram illustrating a hardware configuration of the image processing apparatus 101 according to the present exemplary embodiment. The image processing apparatus 101 has the reading functionality of reading images on documents, and the printing functionality of printing images on sheets (print sheets). Additionally, the image processing apparatus 101 also has the file transmission functionality of converting pieces of image data into files and transmitting them to external apparatuses.

The present exemplary embodiment is described using a multifunction peripheral as an example of the image processing apparatus 101. The present disclosure, however, is not limited to this. For example, an image reading apparatus such as a scanner without a printing function may be used.

A control unit 200 including a central processing unit (CPU) 201 controls the overall operation of the image processing apparatus 101.

The CPU 201 reads control programs stored in a read-only memory (ROM) 202 or storage 204 and performs various types of control such as reading control and print control.

The ROM 202 stores control programs runnable by the CPU 201.

A random-access memory (RAM) 203 is a main storage memory of the CPU 201 and is used as a work area or a temporary storage area into which various types of control programs stored in the ROM 202 and the storage 204 are loaded.

The storage 204 stores print data, image data, various types of programs, and various types of setting information. The storage 204 may be a hard disk drive (HDD) or a solid-state drive (SSD). In the image processing apparatus 101 according to the present exemplary embodiment, a single CPU 201 operates processes illustrated in a flowchart described below, using a single memory (the RAM 203). In some embodiments, other forms are employed. For example, a plurality of CPUs, RAMS, ROMs, and storages cooperate to operate the processes illustrated in the flowchart described below. In other embodiments, some of the processes are operated using a hardware circuit such as an application-specific integrated circuit (ASIC) or a field-programmable gate array (FPGA).

An operation unit interface (I/F) 206 is connected to an operation unit 207. The operation unit 207 includes a touch panel provided with a function as a display unit. The operation unit 207 displays information to users or detects inputs from users via the touch panel. The operation unit 207 also includes hardware keys and detects inputs from users.

A reading unit I/F 208 is connected to a reading unit 209. The reading unit 209 is a scanner. The reading unit 209 scans images on documents, generating pieces of image data. The generated pieces of image data are stored in the storage 204 and transmitted to external apparatuses via the network 100. Images of the generated pieces of image data are printed on sheets by a printing unit 211 based on the storage 204. The reading unit 209 may include an auto document feeder, which conveys a plurality of documents placed on the auto document feeder one by one and reads the images of the conveyed documents.

A printing unit I/F 210 is connected to the printing unit 211. The pieces of image data to be printed are transferred to the printing unit 211 via the printing unit I/F 210. The printing unit 211 receives control commands and the pieces of image data, and prints images based on the pieces of image data on sheets. The printing unit 211 may print them by an electrophotographic method or an inkjet method. In an electrophotographic method, the printing unit 211 forms an electrostatic latent image on its photosensitive member, then develops the electrostatic latent image with toner, transfers this toner image to a sheet, and fixes the transferred toner image, forming an image. On the other hand, in an inkjet method, the printing unit 211 ejects ink drops, printing an image on a sheet.

The image processing apparatus 101 is connected to the network 100 via a network I/F 205. The network I/F 205 is connected to the cloud 102 in the network 100 for the network I/F 205 to communicate with the cloud 102. The network I/F 205 transmits image data generated by the reading unit 209 to the cloud 102.

Print data received via the network I/F 205 is analyzed by the CPU 201 using a software module (a page description language (PDL) analysis unit (not illustrated)) for analyzing print data and stored in the storage 204 or the ROM 202. Based on the print data represented by one of the various types of PDLs, the PDL analysis unit generates data to be printed by the printing unit 211.

The image processing apparatus 101 may include a modem (not illustrated) and have the fax functionality of transmitting image data generated by the reading unit 209 reading a document via the modem.

Figure 3:
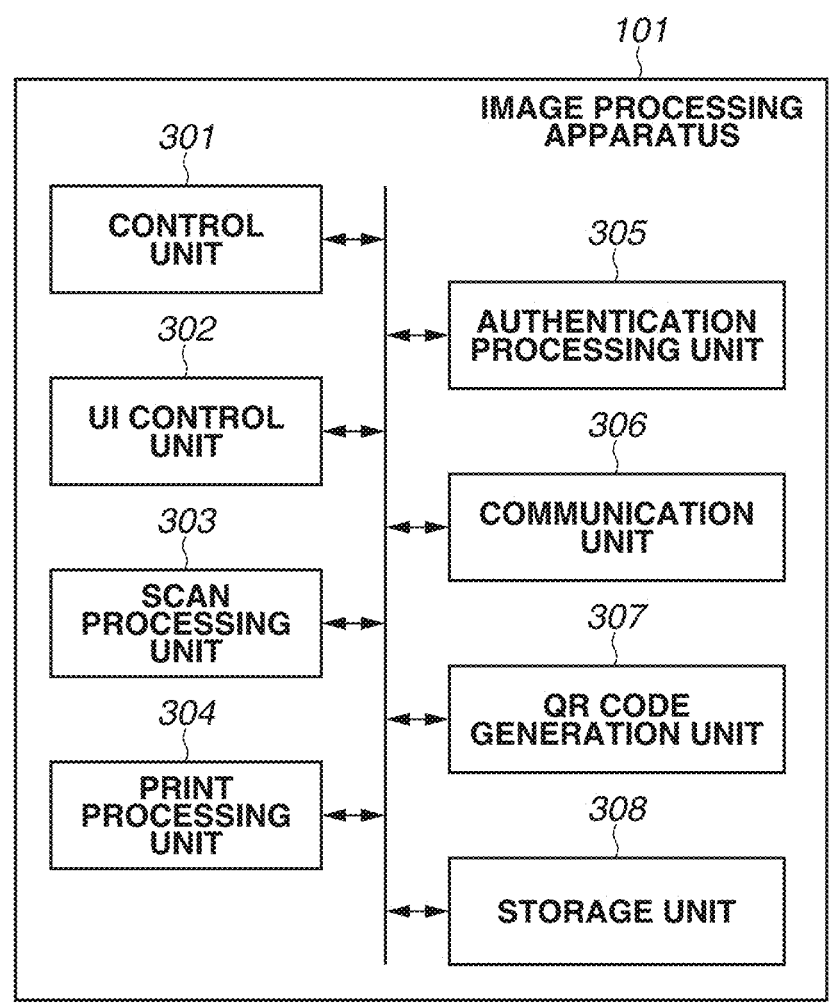
FIG. 3 is a software configuration diagram of the image processing apparatus.

FIG. 3 is a block diagram illustrating a software configuration of the image processing apparatus 101 according to the present exemplary embodiment. The processing of the blocks except for a storage unit 308 is operated by the CPU 201 loading programs stored in the ROM 202 into the RAM 203 and running the programs. The processing of the storage unit 308 is operated by the storage 204.

A control unit 301 controls other modules and generally controls the operations of processes performed in the image processing apparatus 101, such as scanning, transmission, printing, and display processing.

If the image processing apparatus 101 performs user management, an authentication processing unit 305 receives login or logout requests from users. When the authentication processing unit 305 receives a login request, the authentication processing unit 305 performs authentication with reference to the user management information stored in the storage unit 308. If the authentication is successful, the authentication processing unit 305 instructs a user interface (UI) control unit 302 to display a home screen on the operation unit 207. The user management information may be managed by an external server (not illustrated). In this case, the authentication processing unit 305 transmits authentication information to the external server and performs the authentication.

The UI control unit 302 controls the operation unit 207 via the operation unit I/F 206. Specifically, the UI control unit 302 displays user notifications and options on the operation unit 207, receives operations of users on the operation unit 207, and notifies other function units of the content of operations.

A scan processing unit 303 performs scanning using the reading unit 209 via the reading unit I/F 208 and stores read scanned images in the storage unit 308.

A print processing unit 304 performs printing using the printing unit 211 via the printing unit I/F 210.

A communication unit 306 performs communication such as the transmission and reception of data with the cloud 102 or other devices in the network 100 via the network I/F 205.

A Quick Response code (QR Code®) generation unit 307 converts numerical values or text information into QR Codes® as an example of a predetermined code. Generated QR Codes® are displayed on the operation unit 207 via the UI control unit 302 or printed by the print processing unit 304.

According to an instruction from another function unit, the storage unit 308 stores specified data or reads stored data. In the present exemplary embodiment, the storage unit 308 stores and manages image data generated by reading documents, user management information, and data received by the communication unit 306.

Figure 4:
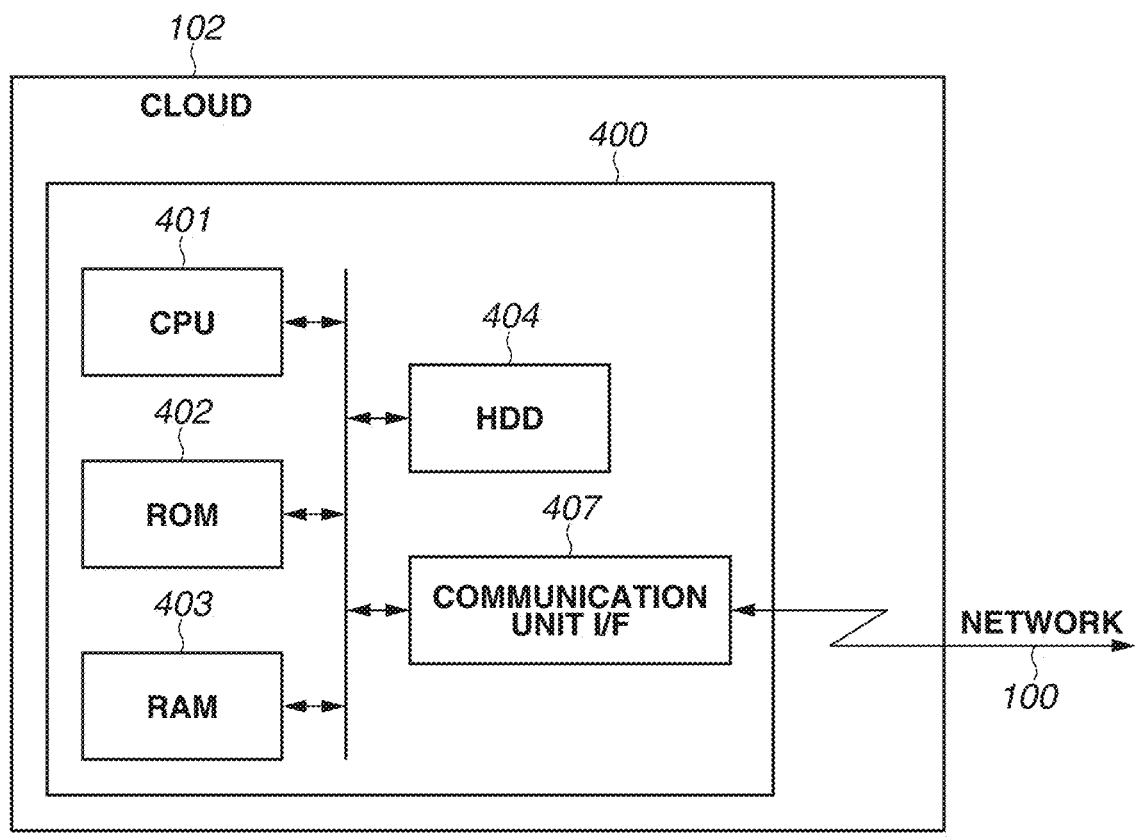
FIG. 4 is a hardware configuration diagram of a cloud.

FIG. 4 is a block diagram illustrating a hardware configuration of the cloud 102 according to the present exemplary embodiment.

A control unit 400 includes a CPU 401 to control the overall operation of the cloud 102.

The CPU 401 includes arithmetic circuitry. The CPU 401 loads programs stored in a ROM 402 or an HDD 404 into a RAM 403 and operates various types of processing.

The ROM 402 stores system programs used in the control of the server 102.

The HDD 404 stores application programs to operate various types of processing, and image data. The HDD 404 is an example of a storage device, and an SSD can be a storage device instead of an HDD.

A communication unit I/F 407 is an interface for connecting various devices to the cloud 102. Based on control of the CPU 401, the communication unit I/F 407 communicates with the image processing apparatus 101 via the network 100.

Additionally, the cloud 102 may include a keyboard, a touch panel, and a display unit.

Figure 5:
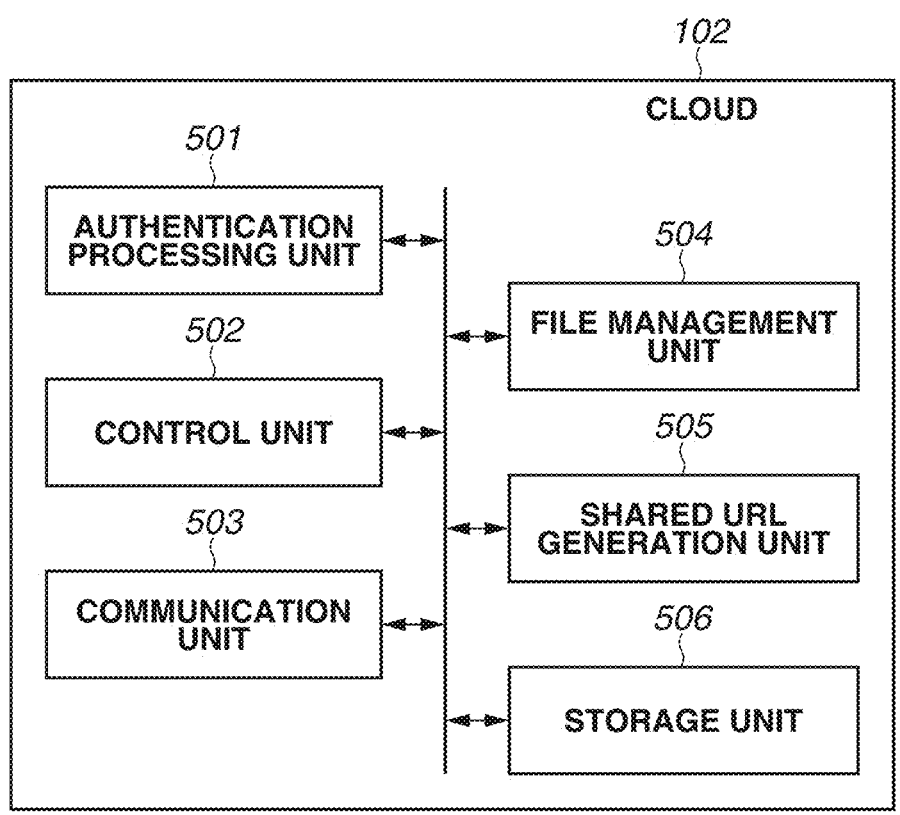
FIG. 5 is a software configuration diagram of the cloud.

FIG. 5 is a software configuration diagram of the cloud 102 according to the present exemplary embodiment. The processing of the blocks except for a storage unit 506 is operated by the CPU 401 loading programs stored in the ROM 402 into the RAM 403 and running them. The storage unit 506 includes the HDD 404.

An authentication processing unit 501 performs processing on login or logout requests to the cloud 102. If the authentication processing unit 501 receives a request to authenticate a login from a user, the authentication processing unit 501 performs an authentication process and returns the result of the authentication.

A communication unit 503 performs communication such as the transmission and reception of data with the image processing apparatus 101 or other devices in the network 100 via the communication unit I/F 407. If the communication unit 503 receives a request from the image processing apparatus 101, the communication unit 503 transmits the content of the request to a control unit 502. When the communication unit 503 receives the result of the control unit 502 performing processing on the request and data, the communication unit 503 transmits a response to the image processing apparatus 101.

According to the content of the request received via the communication unit 503, the control unit 502 instructs a file management unit 504 to perform the processing of storing, deleting, moving, or updating image data received from the image processing apparatus 101. If the content of the request is a request to generate a shared Uniform Resource Locator (URL), the control unit 502 instructs a shared URL generation unit 505 to generate a URL.

According to the instruction from the control unit 502, the file management unit 504 stores image data in the storage unit 506 or deletes, moves, or updates stored image data.

The shared URL generation unit 505 generates a unique URL for data stored in the storage unit 506.

According to an instruction from another function unit, the storage unit 506 stores specified data in the ROM 402, the RAM 403, or the HDD 404 or reads stored data. In the present exemplary embodiment, the storage unit 506 manages image data received via the communication unit 503 and information regarding a URL generated by the shared URL generation unit 505.

Figure 6:
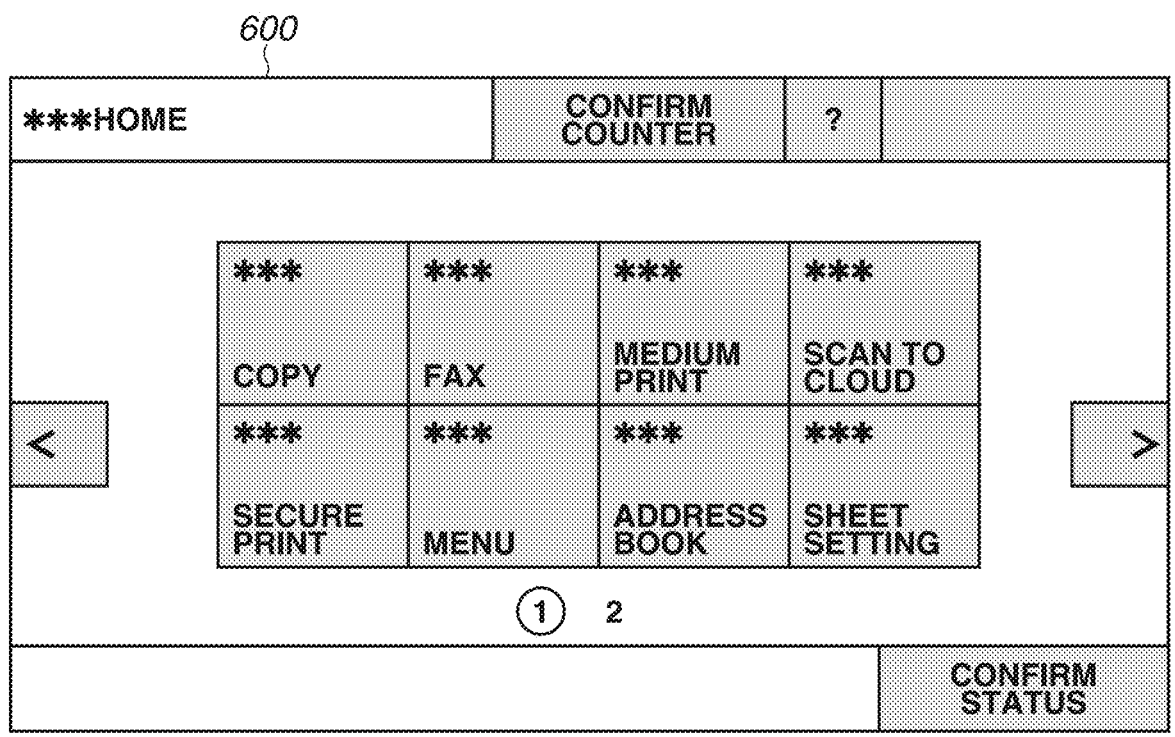
FIG. 6 illustrates an example of a home screen of the image processing apparatus.

FIG. 6 is an example of a home screen 600 of the image processing apparatus 101 displayed on the touch panel of the operation unit 207 according to the present exemplary embodiment. The home screen 600 displays buttons for functions (copy, fax, medium print, and scan to cloud) operable by the image processing apparatus 101. Users press one of the buttons to select the function of the pressed button.

The image processing apparatus 101 has the login functionality. The login function is set to being enabled or disabled by an administrator through the operation unit 207. With the login function enabled, the CPU 201 causes the operation unit 207 to display a login screen (not illustrated) in the state where no one has logged into the image processing apparatus 101. Then, the CPU 201 receives authentication information from the user and authenticates the user based on the received authentication information. If the authentication is successful, the CPU 201 brings the user into the state where the user has logged into the image processing apparatus 101. Then, the CPU 201 causes the operation unit 207 to display the home screen 600. It is assumed that a single user is in the logged-in state at a time. If another user is logging into the image processing apparatus 101, the current log-in user instructs logout via the operation unit 207 to log out of the image processing apparatus 101, which now no one has not logged into the image processing apparatus 101. Under this condition, an input of authentication information about another user on the login screen displayed on the operation unit 207 causes the image processing apparatus 101 to perform authentication based on the input authentication information for the user to log into the image processing apparatus 101. The user inputs the authentication information through a software keyboard displayed on the touch panel of the operation unit 207, then the CPU 201 acquires the authentication information. As another method, the CPU 201 may acquire authentication information from a card held over a card reader of the operation unit 207 by the user through wireless communication. The CPU 201 authenticates the user using the acquired authentication information. If the authentication is successful, the CPU 201 brings the user into the state where the user has logged into the image processing apparatus 101. If the authentication is performed using an external server, the image processing apparatus 101 transmits the acquired authentication information to the external server, the external server performs the authentication, and then, the image processing apparatus 101 receives the result of the authentication from the external server.

With the login function enabled, the image processing apparatus 101 is connected in advance to the cloud 102 and stores an access token for the cloud 102 for each user in the storage unit 308. Specifically, the user logs into the image processing apparatus 101 in advance, accesses the cloud server 102 via a browser, and inputs the user name and a password to the cloud server 102, thereby creating an account for the cloud server 102. Then, the cloud server 102 issues an access token that is then received by the image processing apparatus 101. The access token is associated with the user in the logged-in state and stored in the storage unit 308.

Then, if the user presses the "scan to cloud" button on the home screen 600 in the status where the user has logged into the image processing apparatus 101, the control unit 301 instructs the scan processing unit 303 to perform scanning. Upon the reception of the instruction, the scan processing unit 303 causes the reading unit 209 to start reading a document. After the reading unit 209 reads the document, image data representing an image on the document is generated and saved in the storage unit 308. The control unit 301 instructs the communication unit 306 to transmit the image data stored in the storage unit 308 to the cloud 102. The communication unit 306 transmits to the cloud 102 the image data together with the access token of the user in the logged-in state. Based on the received access token, the cloud 102 identifies a storage area for the user in the storage unit 506 and stores the received image data in the identified storage area. Instead of setting the storage area identified based on the access token to the storage location of the image data, the storage location may be determined using another method. For example, after the "scan to cloud" button is pressed, the image processing apparatus 101 may determine the storage location of the image data in a folder hierarchical list of the cloud 102 received through communication with the cloud 102 in response to the press.

On the other hand, with the login function disabled, the CPU 201 causes the operation unit 207 to display the home screen 600 after the image processing apparatus 101 starts. In this state, even a user who does not register authentication information in the image processing apparatus 101 can use the image processing apparatus 101 without logging into the image processing apparatus 101.

On the image processing apparatus 101 in the office the user works for, the user can easily identify a file path of image data transmitted by the scan to cloud function. On the other hand, if the scan to cloud function is performed using the image processing apparatus 101 in a shared office or a coworking space, a cloud connected in advance to the image processing apparatus 101 belongs to a company that manages the shared office or the coworking space. In this case, it is not easy for the user in the shared office or the coworking space to know the upload location of image data. Meanwhile, in the attempt to connect the image processing apparatus 101 in the shared office or the coworking space to a cloud of the company the user works for, the user goes through a complicated procedure, and a security concern such as a recorded access log also arises.

In the present exemplary embodiment, if the scan to cloud function is performed with the login function disabled, the image processing apparatus 101 transmits image data to the cloud 102 and then requests information indicating the storage location of the image data from the cloud 102. Then, the cloud 102 having received the request issues a URL as the information indicating the storage location of the image data to notify the user of the URL. To notify the user of the URL, for example, the URL may be displayed on the operation unit 207, or printed. By inputting the URL to a smartphone or a personal computer (PC), the user can easily download the image data stored in the cloud 102. Further, the URL converted into a QR Code® may be displayed. By capturing the displayed QR Code® with the camera in the smartphone, the user can easily download the image data stored in the cloud 102 to the smartphone. Besides, the URL converted into a QR Code® may be printed on a sheet. By capturing the QR Code® printed on the sheet with the camera in the smartphone, the user can easily download the image data stored in the cloud 102 to the smartphone. After the transmission of the image data to the cloud 102 is successful, the image processing apparatus 101 may receive the input of an email address from the user and transmit an email including the URL to the received email address. On the smartphone or the PC having received the email, the user can easily download the image data stored in the cloud 102.

According to the present exemplary embodiment, this above-described method enables the user to easily download the image data of a document read and transmitted to the cloud 102 using the PC or the smartphone of the user without logging into the image processing apparatus 101.

FIG. 7 is an example of a sequence between the image processing apparatus 101 and the cloud 102 when an instruction to perform the scan to cloud function is issued on the image processing apparatus 101 in the shared office or the coworking space with the login function disabled. In this sequence, an example will be described where a shared URL is converted into a QR Code®, and the QR Code® is printed. The processing of the image processing apparatus 101 illustrated in the sequence in FIG. 7 is operated by the CPU 201 of the image processing apparatus 101 loading a program stored in the ROM 202 into the RAM 203 and running the program. The processing of the cloud 102 illustrated in the sequence in FIG. 7 is operated by the CPU 401 of the cloud 102 loading programs stored in the ROM 402 into the RAM 403 and running them.

In step S701, the user instructs a start to the image processing apparatus 101 to start the image processing apparatus 101. This start instruction may be an instruction to return from a power saving state.

In the example of FIG. 7, the login function is disabled, and the user of the shared office or the coworking space is not registered in the image processing apparatus 101. Thus, the CPU 201 causes the operation unit 207 to display the home screen 600.

In step S703, the user sets a document on the document platen or the auto document feeder of the reading unit 209 and presses the "scan to cloud" button on the home screen 600.

In step S704, the CPU 201 causes the reading unit 209 to read an image of the document. In step S705, the reading unit 209 reads the document, generating image data. The CPU 201 receives the generated image data from the reading unit 209 and stores the image data in the storage 204.

In step S706, the CPU 201 controls the communication unit 306 to transmit the stored image data to the cloud 102. Using an access token registered in advance for a guest in the storage 204 to connect to the cloud 102, the communication unit 306 transmits the image data generated in step S705 to the cloud 102.

The cloud 102 receives the image data via the communication unit 503 from the image processing apparatus 101. In step S707, the CPU 401 of the cloud 102 instructs the file management unit 504 to store the received image data in the HDD 404. The file management unit 504 stores the image data in the HDD 404. In step S708, the CPU 401 transmits to the image processing apparatus 101 via the communication unit 503 information indicating that the image data has been stored in the HDD 404 and a file path indicating the storage location of the image data stored in step S707.

The image processing apparatus 101 receives via the communication unit 306 the information indicating that the image data has been stored and the file path.

In step S709, the CPU 201 performs a transmission process that transmits to the cloud 102 a request to generate a URL (also referred to as a "shared URL") for downloading the image data, the file path, and setting information for generating the shared URL. The setting information is, for example, an expiration date of the shared URL. The expired shared URL makes it impossible to access the cloud 102 using the shared URL. The expiration date may be a fixed period set in advance in the image processing apparatus 101, or may be input via a screen displayed in response to the user pressing the "scan to cloud" button. Alternatively, such an expiration date may not be set. Another example of the setting information is a password. In response to the shared URL being accessed, the cloud 102 requests the user accessing the cloud 102 using the shared URL to input a password. If a correct password is transmitted, the CPU 401 permits the user to access the cloud 102. Otherwise, the CPU 401 prohibits the user from accessing the cloud 102. This password may also be input via the screen displayed in response to the user pressing the "scan to cloud" button. Such a password may not be included in the setting information.

The CPU 401 of the cloud 102 receives the request to generate the shared URL, the file path, and the selling information via the communication unit 503 from the image processing apparatus 101.

In step S710, based on the received file path, the CPU 401 identifies the image data stored in the storage 404 and generates the shared URL for downloading the image data.

In step S711, the CPU 401 transmits the generated shared URL via the communication unit 503 to the image processing apparatus 101.

The CPU 201 of the image processing apparatus 101 receives the shared URL via the communication unit 306.

In step S712, the CPU 201 causes the QR Code® generation unit 307 to convert the shared URL into a QR Code®.

In step S713, the CPU 201 instructs the printing unit 211 to print on a sheet the QR Code® obtained by the conversion in step S712. The printing unit 211 prints on a sheet the QR Code® following the instruction.

FIG. 8 is a sample of a program when the image processing apparatus 101 transmits the request to generate the shared URL to the cloud 102 in step S709 in FIG. 7. In the present exemplary embodiment, an example of the cloud 102 will be described of using Dropbox®.

Information 801 is the access token for connecting to the cloud 102 and stored in advance in the storage unit 308.

Information 802 specifies the file path on the cloud 102 indicating the location where the image data is stored. In the present exemplary embodiment, the information 802 indicates that the image data is stored with a file name "scan001.jpg" under a folder "images". The storage location of a file and the file name of a file are determined by the CPU 401 of the cloud 102 in accordance with specifications determined in advance. The present disclosure, however, is not limited to this. The storage location of the file and the file name of the file may be specified by the user via a screen on the operation unit 207 in the image processing apparatus 101. Alternatively, a configuration may be employed in which the storage location of the file is determined by the user selecting one of the hierarchical levels of folders acquired from the cloud 102 displayed by the image processing apparatus 101.

Information 803 calls an application programming interface (API) for specifying the image data (scan_file) obtained through scanning and for uploading the image data to the cloud 102.

Information 804 sets a parameter specified in the generation of a shared URL. The parameter specified in the information 804 means that the generated shared URL is a URL accessible by anyone without a login.

Information 805 calls an API for generating the shared URL based on the parameter specified in the information 804.

Figure 9:
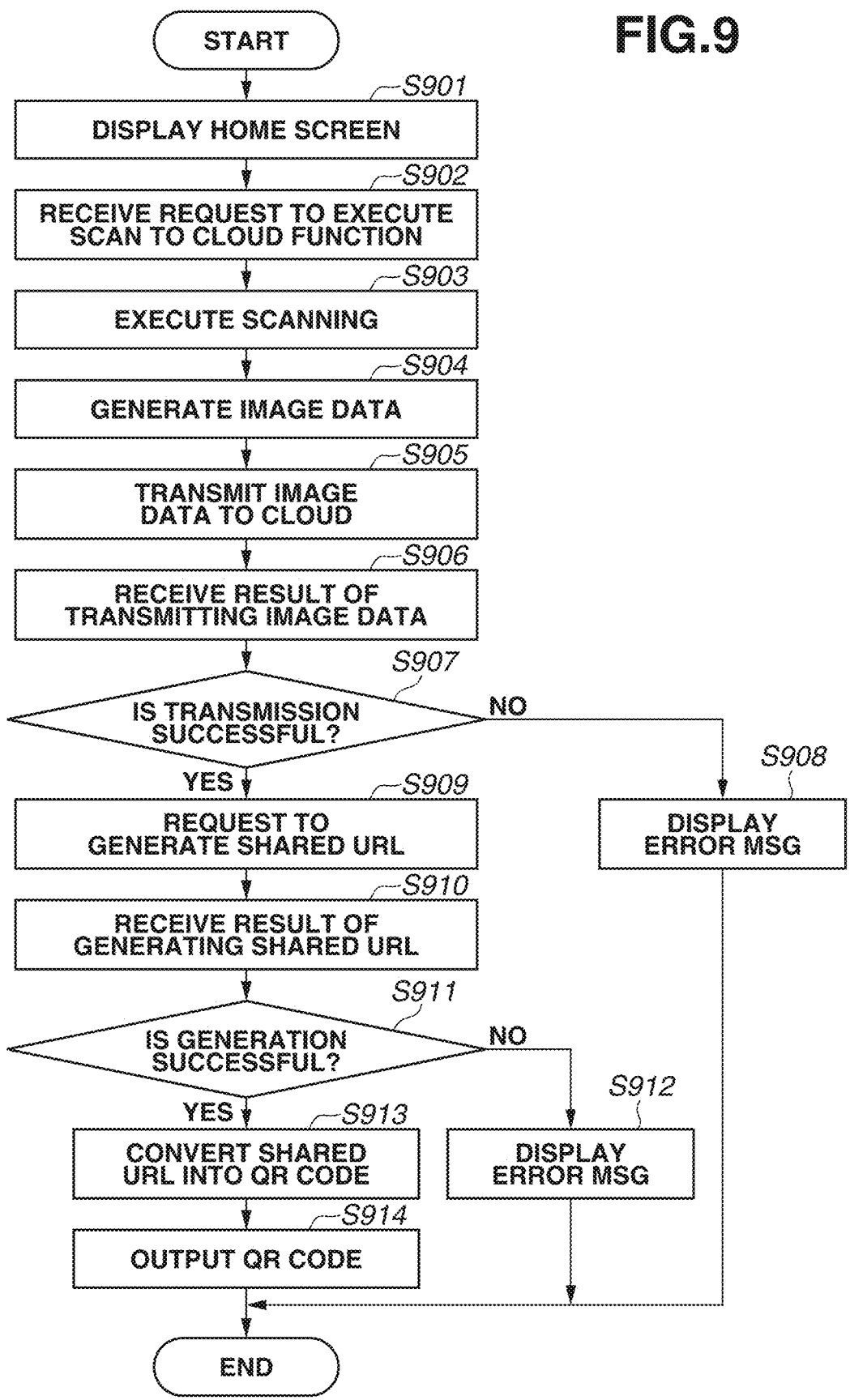
FIG. 9 is a flowchart of the image processing apparatus when a scan to cloud function is executed.

FIG. 9 is an example of a flowchart of the image processing apparatus 101 when the scan to cloud function is performed by the image processing apparatus 101 according to the present exemplary embodiment. The processing of the image processing apparatus 101 in the flowchart in FIG. 9 is operated by the CPU 201 of the image processing apparatus 101 loading programs stored in the ROM 202 into the RAM 203 and running them.

After the image processing apparatus 101 starts, in step S901, the CPU 201 causes the operation is it 207 to display the home screen 600.

In step S902, the user presses the "scan to cloud" button displayed on the home screen 600, whereby the CPU 201 receives a request to perform the scan to cloud function.

In step S903, the CPU 201 issues an instruction to perform reading to the reading unit 209 via the reading unit I/F 208 and causes the reading unit 209 to read a document.

In step S904, the CPU 201 stores image data representing an image of the read document in the storage 204.

In step S905, the CPU 201 operates an uploading process (a transmission process) for transmitting the image data stored in the storage 204 to the cloud 102.

In step S906, the CPU 201 receives, from the cloud 102 via the network I/F 205, information indicating whether the uploading (transmission) of the image data is successful or has failed and a folder path indicating the location where the image data is stored.

In step S907, based on the information received in step S906, the CPU 201 determines whether the uploading of the image data is successful or has failed. If the CPU 201 determines that the uploading has failed (No in step S907), the processing proceeds to step S908. In step S908, the CPU 201 causes the operation unit 207 to display an error message (Msg) indicating that the uploading of the image data has failed. Then, the processing illustrated in the flowchart in FIG. 9 ends.

If the CPU 201 determines that the uploading of the image data is successful (Yes in step S907), the processing proceeds to step S909. In step S909, the CPU 201 operates a transmission process for transmitting to the cloud 102 a request to generate a shared URL for downloading the uploaded image data, the folder path received in step S906, and setting information.

In step S910, the CPU 201 receives the result of generating the shared URL transmitted from the cloud 102 in response to the generation request transmitted in step S909.

In step S911, the CPU 201 determines whether the generation of the shared URL is successful or has failed. If the CPU 201 determines that the generation of the shared URL has failed (No in step S911), then in step S912, the CPU 201 causes the operation unit 207 to display an error Msg indicating that the generation of the shared URL has failed. Then, the processing illustrated in the flowchart in FIG. 9 ends.

If the CPU 201 determines in step S911 that the generation of the shared URL is successful (Yes in step S911), then in step S913, the CPU 201 instructs the QR Code® generation unit 307 to convert the received shared URL into a QR Code®.

In step S914, the CPU 201 instructs the printing unit 211 to print the QR Code® generated by the shared URL code generation unit 307. The printing unit 211 prints on a sheet the QR Code® following the instruction.

Figure 10:
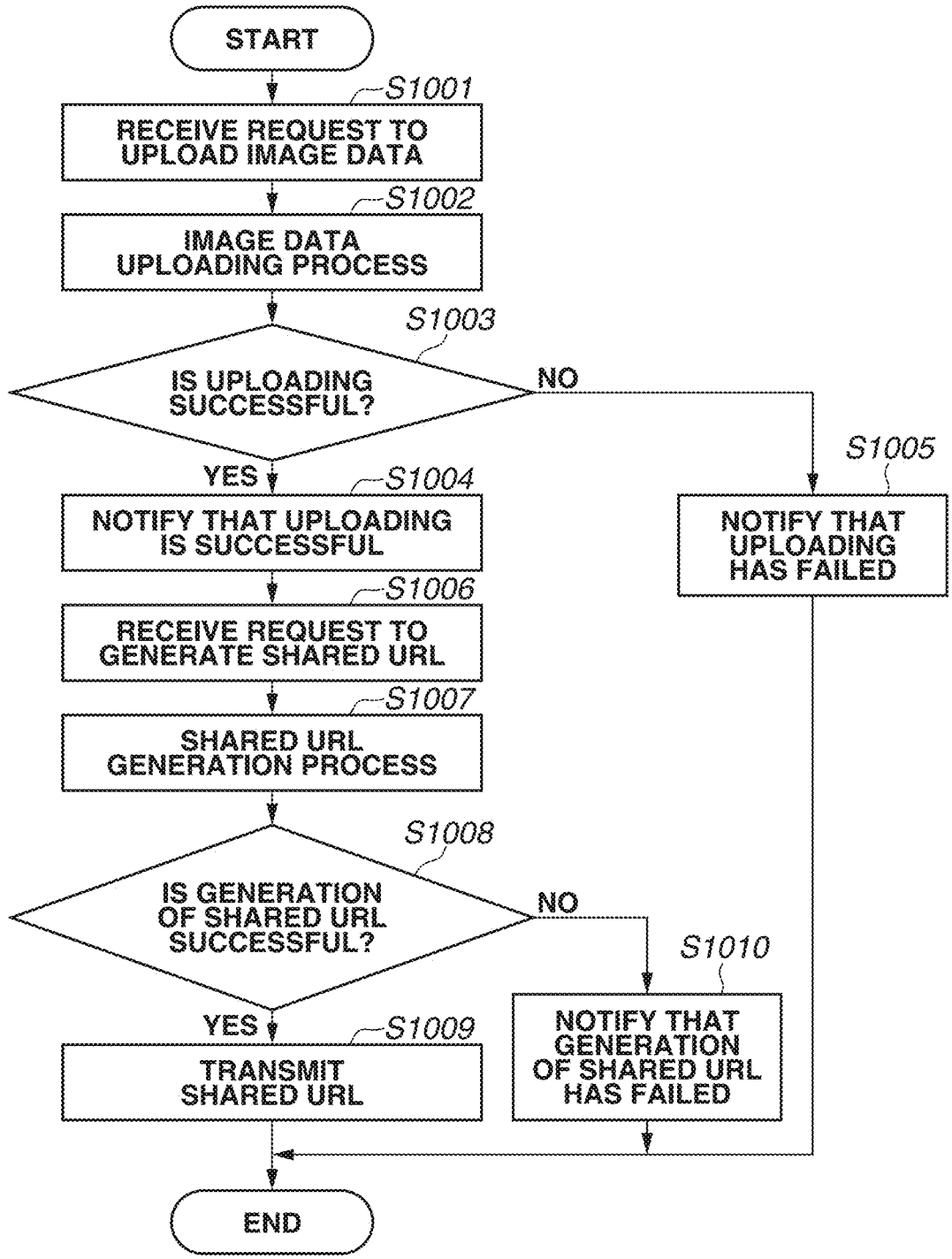
FIG. 10 is a flowchart of the cloud when the scan to cloud function is performed.

FIG. 10 is an example of a flowchart of the cloud 102 when the scan to cloud function is performed by the image processing apparatus 101. The processing illustrated in the flowchart in FIG. 10 is operated by the CPU 401 of the cloud 102 loading programs stored in the ROM 402 into the RAM 403 and running them.

In step S1001, the CPU 401 receives from the image processing apparatus 101 a request to upload image data.

In step S1002, according to a parameter specified in the file management unit 504, the CPU 401 stores the received image data in the HDD 404.

In step S1003, the CPU 401 determines whether the storage of the image data in the HDD 404 is successful (whether the uploading of the image data to the cloud 102 is successful).

If the CPU 401 determines that the storage of the image data in the HDD 404 is successful (Yes in step S1003), then in step S1004, the CPU 401 notifies the image processing apparatus 101 of information indicating that the uploading of the image data is successful.

If the storage of the image data in the HDD 404 has faded (No in step S1003), then in step S1005, the CPU 401 notifies the image processing apparatus 101 of information indicating that the uploading of the image data has failed.

In step S1006, the CPU 401 receives from the image processing apparatus 101 a request to generate a shared URL.

In step S1007, the CPU 401 generates the shared URL for downloading the stored image data.

In step S1008, the CPU 401 determines whether the generation of the shared URL is successful. If the CPU 401 determines that the generation of the shared URL is successful (Yes in step S1008), the processing proceeds to step S1009. If the CPU 401 determines that the generation of the shared URL has failed (No in step S1008), the processing proceeds to step S1010.

In step S1009, the CPU 401 operates a transmission process for transmitting the generated shared URL to the image processing apparatus 101.

If the CPU 401 determines that the generation of the shared URL has failed, then in step S1010, the CPU 401 notifies the image processing apparatus 101 that the generation of the shared URL has failed.

Then, when the cloud 102 receives a request to download the image data based on the URL, the cloud 102 transmits, to the apparatus having transmitted the downloading request, the image data stored at the location indicated by the URL. This allows the apparatus to store the transmitted image data and display the stored image data on a browser or save the stored image data.

The above control enables image data generated by reading a document and transmitted to a cloud server to be easily received by another apparatus without an account for the cloud server. Particularly, image data generated by a document being read on the image processing apparatus 101 in a shared office or a coworking space is easily available for a user via a URL generated by the cloud 102.

In addition, in response to the reception of an instruction to read a document in the state where no one has logged into the image processing apparatus 101, the image processing apparatus 101 requests the cloud 102 to generate a shared URL without separately instructing the cloud 102 to generate the shared URL. On the other hand, if someone has logged into the image processing apparatus 101, the image processing apparatus 101 does not request the cloud 102 to generate the shared URL. This prevents excess shared URLs from being generated if a user easily accesses a cloud server of the user and obtains image data later.

Other Exemplary Embodiments

In the present exemplary embodiment, an example has been described where the processing illustrated in FIG. 7 is operated when the scan to cloud function is performed with the login function of the image processing apparatus 101 disabled. The present disclosure, however, is not limited to this example. In some embodiments, if no one has logged into the image processing apparatus 101 with the login function enabled, the scan-to-cloud function is available, and the processing illustrated in FIG. 7 is performed. Specifically, with the login function enabled, even if no one has logged into the image processing apparatus 101, the CPU 201 causes the operation unit 207 to display the home screen 600 in FIG. 6. A guest user operates the "scan to cloud" button on the home screen 600, thereby enabling the reading of an image on a document and the transmission of image data generated by reading the image to the cloud 102. Then, the processing illustrated in FIG. 7 is operated. In other embodiments, the image processing apparatus 101 causes the operation unit 207 to display an authentication screen by the user selecting an authentication screen calling button (not illustrated) while the home screen 600 in FIG. 6 is displayed on the operation unit 207. Then, the image processing apparatus 101 receives authentication information from the user and authenticates the user based on the received authentication information. If the authentication is successful, the image processing apparatus 101 brings the user into the state where the user has logged into the image processing apparatus 101. It is assumed that a single user is in the logged-in state at a time. If another user is logging into the image processing apparatus 101, the current logged-in user instructs logout via the operation unit 207 to log out of the image processing apparatus 101, which now no one has logged in the image processing apparatus 101. In this state, when the authentication screen is displayed on operation unit 207 with the authentication screen calling button, the other user inputs authentication information. The image processing apparatus 101 performs authentication based on the input authentication information, whereby the log-in of the other user becomes successful. On the other hand, the CPU 201 acquires the authentication information by the user inputting the authentication information with a software keyboard displayed on the touch panel of the operation unit 207. In other embodiments, the user holds a card over a card reader of the operation unit 207, whereby the CPU 201 acquires the authentication information from the card through wireless communication. The CPU 201 authenticates the user by the acquired authentication information. If the authentication is successful, the CPU 201 brings the user into the state where the user has logged into the image processing apparatus 101. If an external server performs the authentication, the image processing apparatus 101 transmits the acquired authentication information to the external server, the external server performs the authentication, and then, the image processing apparatus 101 receives the result of the authentication from the external server. At this time, the processes of step S709 and the subsequent steps illustrated in FIG. 7 may not be performed. At this time, in step S708, the file path may not be transmitted.

Besides, information regarding whether to instruct the cloud 102 to generate a shared URL may be stored as a setting of the image processing apparatus 101.

Embodiments of the present disclosure can also be implemented by the process of supplying a program for performing one or more functions of the above exemplary embodiments to a system or an apparatus via a network or a storage medium, and of causing one or more processors of a computer of the system or the apparatus to read and run the program. Embodiments of the present disclosure can also be implemented by a circuit (e.g., an ASIC) for performing one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-113361, filed Jun. 30, 2020, which is hereby incorporated by reference herein in its entirety.

What is claimed is:

1. An image processing apparatus which is able to communicate with a cloud service via a network, the image processing apparatus comprising:
   a scanner configured to scan an image on a document;
   one or more processors; and
   at least one memory storing executable instructions, which when executed by the one or more processors, cause the image processing apparatus to:
      transmit image data generated based on the scanned image to the cloud service;
      transmit, to the cloud service, a request for the cloud service to generate storage destination information indicating a storage destination of the image data transmitted to the cloud service, and information indicating an expiration date corresponding to the storage destination information;
      receive the storage destination information transmitted based on the request from the cloud service;
      generate code information based on the received storage destination information; and
      notify a user of the generated code information for allowing, prior to the expiration date, another apparatus to capture the code information and receive the image data transmitted from the cloud service.

2. The image processing apparatus according to claim 1, wherein the executable instructions, when executed by the one or more processors, further cause the image processing apparatus to:
   allow a user to log into the image processing apparatus; and
   receive an instruction to scan the image on the document using the scanner,
   wherein based on the fact that the instruction is received in a state where no one has logged into the image processing apparatus, the cloud service is requested to generate the storage destination information indicating the storage destination of the transmitted image.

3. The image processing apparatus according to claim 2, wherein when the instruction is received in a state where the user has logged into the image processing apparatus, the cloud service is not requested to generate the storage destination information indicating the storage destination of the transmitted image.

4. The image processing apparatus according to claim 1, wherein based on the fact that the transmission of the image scanned by the scanner to the cloud service is successful, the cloud service is requested to generate the storage destination information indicating the storage destination of the transmitted image.

5. The image processing apparatus according to claim 1, further comprising a display,
   wherein the user is notified of the code information by displaying the code information on the display.

6. The image processing apparatus according to claim 1, further comprising a printer,
   wherein the user is notified of the code information by the printer printing the code information.

7. The image processing apparatus according to claim 1, wherein the code information is a QR Code®.

8. The image processing apparatus according to claim 1, wherein the cloud service is a storage service for storing images.

9. A control method of controlling an image processing apparatus which is able to communicate with a cloud service via a network, the control method comprising:
   scanning an image on a document;
   transmitting image data generated based on the scanned image to the cloud service;
   transmitting, to the cloud service, a request for the cloud service to generate storage destination information indicating a storage destination of the image data transmitted to the cloud service, and information indicating an expiration date corresponding to the storage destination information;
   receiving the storage destination information transmitted based on the request from the cloud service;
   generating code information based on the received storage destination information; and
   notifying a user of the generated code information for allowing, prior to the expiration date, another apparatus to capture the code information and receive the image data transmitted from the cloud service.

10. The control method according to claim 9, the control method further comprising:
- allowing a user to log into the image processing apparatus; and
- receiving an instruction to scan the image on the document,
- wherein based on the fact that the instruction is received in a state where no one has logged into the image processing apparatus, the cloud service is requested to generate the storage destination information indicating the storage destination of the transmitted image.

11. The control method according to claim 10, wherein when the instruction is received in a state where the user has logged into the image processing apparatus, the cloud service is not requested to generate the storage destination information indicating the storage destination of the transmitted image.

12. The control method according to claim 9, wherein based on the fact that the transmission of the scanned image to the cloud service is successful, the cloud service is requested to generate the storage destination information indicating the storage destination of the transmitted image.

13. The control method according to claim 9, wherein the user is notified of the code information by displaying the code information.

14. The control method according to claim 9, wherein the code information is a QR Code®.

15. The control method according to claim 9, wherein the cloud service is a storage service for storing images.

16. A non-transitory computer-readable storage medium storing a computer program for causing a computer to execute a control method of controlling an image processing apparatus which is able to communicate with a cloud service via a network, the control method comprising:
- scanning an image on a document;
- transmitting image data generated based on the scanned image to the cloud service;
- transmitting, to the cloud service, a request for the cloud service to generate storage destination information indicating a storage destination of the image data transmitted to the cloud service, and information indicating an expiration date corresponding to the storage destination information;
- receiving the storage destination information transmitted based on the request from the cloud service;
- generating code information based on the received storage destination information; and
- notifying a user of the generated code information for allowing, prior to the expiration date, another apparatus to capture the code information and receive the image data transmitted from the cloud service.

17. A non-transitory computer-readable storage medium storing a computer program for causing a computer to execute a control method of controlling an information processing apparatus which is able to communicate with a cloud service via a network, the control method comprising:
- inputting an image;
- transmitting the input image to the cloud service;
- transmitting, to the cloud service, a request for the cloud server to generate storage destination information which indicates a storage destination of the image and an expiration period of the storage destination information;
- receiving the storage destination information transmitted based on the request from the cloud service;
- generating code information based on the received storage destination information; and
- outputting the generated code information for allowing another apparatus to capture the code information, access the cloud server and receive the image from the cloud service,
- wherein access to the cloud server is inhibited after the expiration period of the storage destination information.

18. The non-transitory computer-readable storage medium according to claim 17, wherein the generated code information is displayed for allowing the another apparatus to capture the code information.

19. The non-transitory computer-readable storage medium according to claim 17, wherein the code information is a QR Code®.

20. The non-transitory computer-readable storage medium according to claim 17, wherein the cloud service is a storage service for storing images.

* * * * *